United States Patent [19]
Hartford

[11] 4,369,596
[45] Jan. 25, 1983

[54] LIQUID APPLYING APPARATUS

[76] Inventor: Thomas D. Hartford, 4221 Lewis Ave., Great Falls, Mont. 59405

[21] Appl. No.: 301,885

[22] Filed: Sep. 11, 1981

Related U.S. Application Data

[63] Continuation-in-part of Ser. No. 109,804, Feb. 6, 1980, abandoned.

[51] Int. Cl.³ ............................................. A01M 21/00
[52] U.S. Cl. ........................................ 47/1.5; 56/16.8
[58] Field of Search ............. 47/1.5; 56/16.8, DIG. 5, 56/DIG. 13

[56] References Cited

U.S. PATENT DOCUMENTS

| | | | |
|---|---|---|---|
| 1,109,060 | 9/1914 | Griffin | 47/1.5 |
| 1,527,669 | 2/1925 | Camp | 47/1.5 |
| 1,764,952 | 6/1930 | Hay | 47/1.5 |
| 2,696,696 | 12/1954 | Tigerman | 56/DIG. 5 |
| 2,973,615 | 3/1961 | Yaremchuk et al. | 47/1.5 X |
| 2,991,914 | 7/1961 | Janssen | 56/16.8 X |
| 3,021,642 | 2/1962 | Ewing | 47/1.5 |
| 4,332,107 | 6/1982 | Read | 47/1.5 |

*Primary Examiner*—James R. Feyrer
*Attorney, Agent, or Firm*—Arthur L. Urban

[57] ABSTRACT

Liquid applying apparatus mountable on a lawnmower, the apparatus including a liquid storing portion, a liquid distributing portion and a mounting portion; the liquid storing portion including a substantially airtight chamber, an opening adjacent the bottom of the storing chamber, a conduit extending downwardly from the storing chamber opening to the liquid distributing portion, the liquid distributing portion including a substantially horizontal distribution chamber, the distribution chamber including an inlet opening adjacent the top thereof, the inlet opening being connectable with the conduit, a plurality of spaced outlet openings in the distribution chamber, the outlet openings being arranged along at least one substantially horizontal line disposed longitudinally of the distribution chamber and located intermediate the top and bottom of the chamber, the conduit extending through the inlet opening of the distribution chamber to a point adjacent the horizontal line of openings in the chamber, textile material disposed with one end section wrapped around the periphery of the distribution chamber and the opposite end section extending from the wrapped section; the mounting portion including at least one bracket having one end affixable to the distribution chamber, a support extending upwardly from the bracket capable of supporting the liquid storing portion above the distribution chamber.

10 Claims, 2 Drawing Figures

U.S. Patent    Jan. 25, 1983    4,369,596
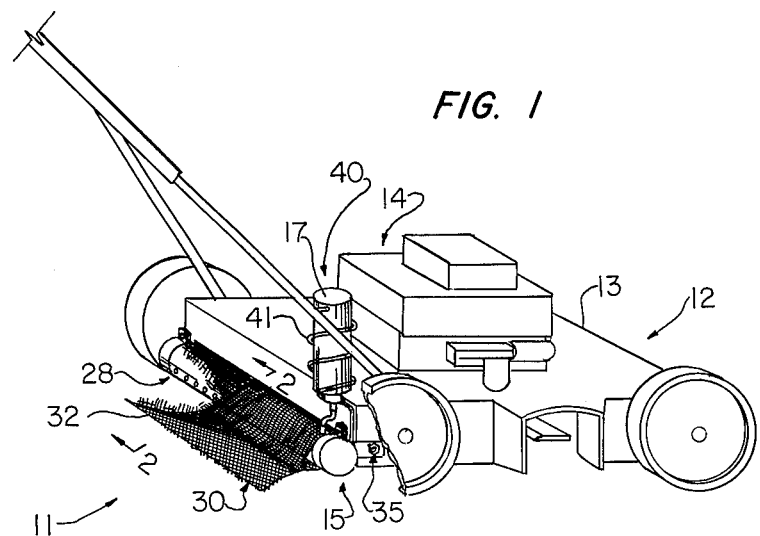
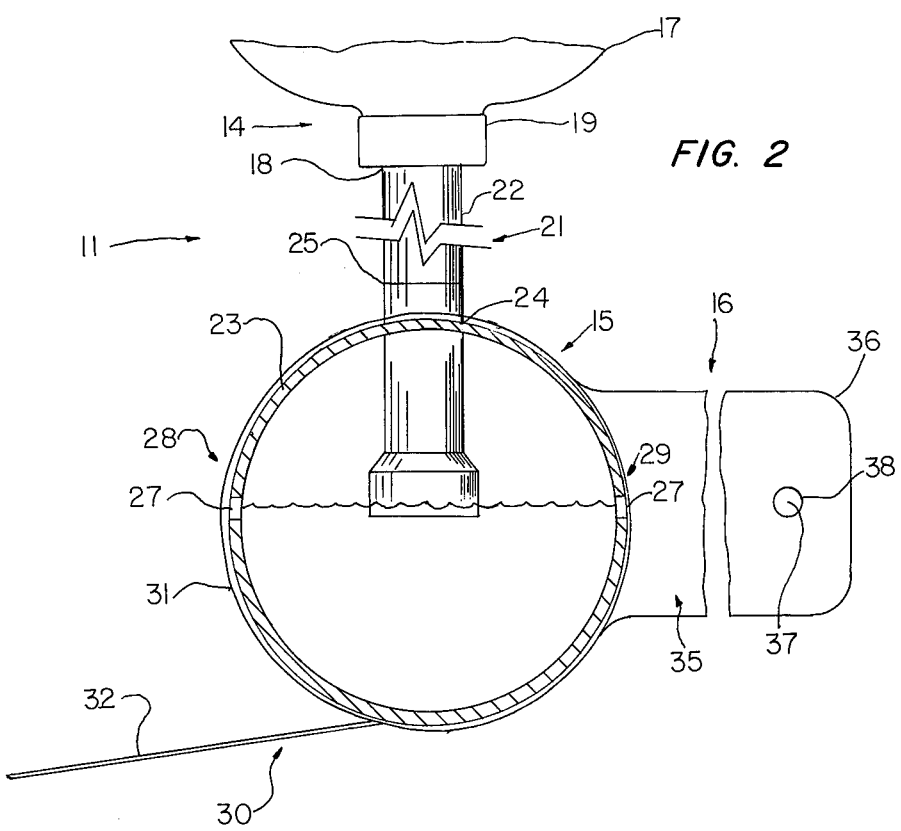

LIQUID APPLYING APPARATUS

This application is a continuation-in-part of pending application Ser. No. 109,804, filed Feb. 6, 1980, now abandoned.

This invention relates to a novel liquid applying apparatus and more particularly relates to a new liquid applying apparatus for use with a lawnmower or similar machinery.

It is a common occurrence to see weeds growing with desirable plants. Casual inspection of most plantings indicates that many plantings include at least a few weeds among the desired plant materials.

The removal and elimination of weeds from desired plantings has become a major industry. Although many different means have been developed for weed removal, simple hand weeding still is utilized in many situations. Hand weeding is commonly employed when the use of other methods may destroy the desirable plants. Also, hand weeding is used where only a limited amount of weeding is required.

Some hand weeding is accomplished with simple hand tools such as hoes, trowels and the like. Such tools may eliminate stooping and may provide a convenient way to cut or remove deep roots and the like. A variety of weeding tools have been developed for specialized weeding tasks and some have found a degree of acceptance.

Another major direction in weed removal is the use of chemicals to kill the weeds. While some weed removal applications may tolerate complete removal of the vegetation, most end uses require that the desirable species not be affected by the chemicals. Because of this objective, considerable work has been directed to the development of so-called selective weedkillers, that is, chemical formulations that will destroy the weeds without adversely affecting the growth of the desired plants.

Even though weedkilling materials have gained wide acceptance, they still have certain problems. One of the major problems is that they are chemicals which often are harmful to human beings and animal life. Thus, it is important that weedkillers be handled very carefully.

To minimize undesirable contact with weedkillers, a number of different devices are offered for the application of the materials. Distributing equipment is available both for liquid and solid formulations. The particular type of equipment employed generally is determined by the size of the area being weeded. The equipment generally either is for home garden use or for commercial operations.

Examples of particular weeding equipment are disclosed in U.S. Pat. Nos. 1,109,060; 1,527,669; 1,764,952 and 3,021,642. The first patent is directed to a boll weevil exterminator, the second and third patents to attachments for cultivators and the fourth for a lawnmower accessory.

One of the problems with weedkiller applicators is achieving uniform distribution of the chemicals. If the equipment is momentarily stopped as it is being moved over an area, the weedkilling chemical may continue to be delivered from the device. If an excessive quantity of weedkiller is applied to a given area, the selectivity of the chemical may become ineffective and both the desired plants and the weeds will be killed.

In attempts to prevent the delivery of excessive chemicals, the above devices include a shut-off valve. Although such valves do stop the flow of weedkiller, they present other problems.

To open or close the valve, it is necessary for the operator of the cultivator or mower to remove one hand from the controls of the equipment and move it to the valve. This must be done quickly to prevent the delivery of excess chemical and may require that the operator direct his eyes toward the valve. An additional problem is that the equipment ordinarily is stopped or slowed to maneuver the equipment which makes control with one hand even more difficult as the valve is changed.

From the above discussion, it is apparent that the weedkiller applicators previously available frequently do not provide a desirable expedient for many individuals. Thus, people still are seeking a means for killing weeds that meet their particular requirements.

The present invention provides a novel liquid applying apparatus. The liquid applying apparatus of the invention provides a simple and convenient means for distributing liquids uniformly. The apparatus provides a means for applying a weedkiller or fertilizer liquid while operting a lawnmower. The liquid applying apparatus provides uniform distribution without taking a hand from the controls of the mowing machinery.

The liquid applying apparatus of the invention is simple in design and can be manufactured relatively inexpensively. The apparatus can be fabricated from commercially available materials and components employing conventional metal/plastic techniques and procedures.

The liquid applying apparatus can be used by most persons after only a minimum of instruction. The apparatus can be installed easily and quickly by individuals with limited mechanical skills. The apparatus can be removed from a mower or changed to a different mower in a few minutes. The apparatus is durable in construction and has a long useful life. Little maintenance is required to keep the apparatus in working condition.

These and other benefits and advantages of the novel liquid applying apparatus will be apparent from the following description and the accompanying drawings in which:

FIG. 1 is a view in perspective of one form of the liquid applying apparatus of the invention; and FIG. 2 is an enlarged sectional view of the liquid distributing portion of the apparatus shown in FIG. 1 taken along line 2—2 thereof.

As shown in the drawings, one form of the novel liquid applying apparatus 11 of the present invention is mounted on a lawnmower 12 including a housing 13. The liquid applying apparatus 11 of the invention includes a liquid storing portion 14, a liquid distributing portion 15 and a mounting portion 16.

The liquid storing portion 14 includes a substantially airtight storage chamber 17. An opening 18 is located adjacent the bottom of the storage chamber 17. Preferably, the storage chamber 17 includes a separable closure 19 with the opening 18.

Conduit means 21 extends downwardly from the storage chamber opening 18 to the liquid distributing portion 15. Advantageously, the conduit 21 includes a flexible section 22.

The liquid distributing portion 15 includes a substantially horizontal distribution chamber 23. The distribution chamber 23 has a length substantially greater than the cross section thereof. The distribution chamber 23 includes an inlet opening 24 adjacent the top thereof. The inlet opening 24 is connectable with the conduit 21. Preferably, the conduit 21 includes a separable section 25 extending through the inlet opening 24 into the distribution chamber 23.

The distribution chamber 23 also includes a plurality of spaced outlet openings 27. The outlet openings 27 are arranged along at least one, and advantageously two, substantially horizontal lines 28 and 29 disposed longitudinally of the distribution chamber 23. The spaced openings 27 advantageously extend along substantially the entire length of the distribution chamber 23. The line of openings is located intermediate the top and the bottom of the distribution chamber.

When the two lines of openings are employed, the second line 24 of openings is disposed on the opposite side of the distribution chamber 23 from the first line 28 of openings. Also, the second line 29 of openings preferably is located at the same level as the first line 28. The conduit 21 extends through the inlet opening 24 to a point below the horizontal lines 28 and 29 of openings along the sides of the distribution chamber 23.

Textile material 30 is associated with the distribution chamber 23. The textile material is disposed with one end section 31 wrapped around the periphery of the distribution chamber 23. The wrapped section 31 of the textile material 30 is affixed together such as with an adhesive, stitching or the like.

The opposite end section 32 of the textile material 30 extends from the wrapped section 31 a distance greater than the diameter of the distribution chamber 23. Advantageously, the textile material 30 is a napped fabric such as terry cloth. Preferably, the textile material extends along substantially the entire length of the distribution chamber 23.

The mounting portion 16 of the liquid applying apparatus 11 of the invention includes at least one, and preferably two, bracket means 35. The bracket or brackets 35 have one end affixable to the distribution chamber 23. Advantageously, brackets are connectable adjacent both ends of the distribution chamber.

Each bracket 35 includes a connector section 36 that extends from the distribution chamber 23. Fastening means shown as bolts 37 through openings 38, are disposed adjacent the free end of the connector section 36. The fastening means are connectable to housing 13 of lawnmower 12. Advantageously, the mounting portion 16 is pivotably connected to the lawnmower 12.

Support means 40 extends upwardly from the connector section 36. The support means 40 is capable of supporting the liquid storing portion 14 above the distributing portion 25. As shown, the support means 40 includes a spirally wound wire cage 41 in which the storing chamber 17 is inserted.

The liquid applying apparatus 11 of the present invention may be fabricated from a variety of materials such as metals, plastics and the like. The apparatus advantageously is formed of plastic materials because of the noncorrosive character of such materials. For example, the storing chamber 17, the conduit 21 and the distribution chamber 23 may be formed of plastic. The brackets 35 and support 40 preferably may be formed of high strength metals. The textile material 30 advantageously is a highly absorbent napped textile such as a terry cloth.

In the use of the liquid applying apparatus 11 of the invention, the apparatus is mounted on a housing 13 of a lawnmower 12 through brackets 35 with bolts 37 inserted through openings 38. The apparatus 11 preferably is pivotally connected to the mower housing 13. The storage chamber 17 is removed from the support 40 and filled with the weedkiller mixture. The storage chamber 17 then is returned to its normal position with the opening 18 thereof extending downwardly and connected to the conduit 21. Some of the liquid flows into the distribution chamber 23.

Since the outlet openings 27 of the distribution chamber 23 are located midway vertically, the liquid will fill the chamber 23 only to the level of the openings. When this level is achieved, the liquid will flow through the openings 27 and be absorbed by the textile material 30 which is wrapped around the distribution chamber 23.

When the mower is driven over a lawn with liquid saturating the textile material 30 and particularly the extended portion 32, liquid will pass from the textile material onto the grass and weed plants of the lawn. Since the weedkiller acts selectively on the weeds in the lawn, the weed plants absorbing the chemical on their surfaces will be destroyed.

As the liquid in the distribution chamber 23 is absorbed into the surrounding textile material 30, additional quantities of the weedkiller liquid in storage chamber 17 will flow into the distribution chamber to maintain the liquid level therein. Since the storage chamber 17 is an airtight chamber disposed in an inverted position, a vacuum will be created above the liquid level in the storage chamber 17. This vacuum restricts the flow of liquid from the storage chamber 17 into the distribution chamber 23. However, the vibration and shaking of the apparatus 11 as the mower is driven over a lawn will provide sufficient agitation of the liquid to allow it to flow in restricted amounts into the distribution chamber 23.

When the supply of liquid weedkiller in the storage chamber 17 is consumed, the storage chamber can be removed from support 40 again and refilled for resumption of the mowing and weedkilling operations. To reduce the frequency with which the storage chamber 17 needs to be refilled for large lawn areas, a storage chamber of substantially larger size can be employed.

The above description and the accompanying drawings show that the present invention provides a novel liquid applying apparatus. The liquid applying apparatus of the invention provides means for applying chemicals while mowing a lawn or performing other plant care operations. The apparatus distributes chemicals uniformly without requiring that a hand be removed from the controls of the mower to regulate the distribution of chemicals from the apparatus.

The liquid applying apparatus of the invention is convenient to use after only a minimum of instruction. The apparatus can be installed easily and quickly without special skills or tools. The apparatus can be removed from a mower or changed to a different mower in a few minutes.

The liquid applying apparatus is simple in design and relatively inexpensive to manufacture. The apparatus can be fabricated from commercially available materials and components employing conventional metal and plastic fabricating techniques and procedures. The apparatus is durable in construction and has a long useful life with only a minimum of maintenance.

It will be apparent that various modifications can be made in the particular liquid applying apparatus described in detail and shown in the drawings within the scope of the invention. The size, configuration and arrangement of components can be changed to meet specific requirements. The mounting arrangement can be different to facilitate mounting on particular mower models or other equipment. These and other changes can be made provided the functioning and operation of the liquid applying apparatus are not deleteriously affected. Therefore, the scope of the invention is to be limited only by the following claims.

What is claimed is:

1. Liquid applying apparatus mountable on a lawnmower, said apparatus including a liquid storing portion, a liquid distributing portion and a mounting portion; said liquid storing portion including a substantially airtight chamber, an opening adjacent the bottom of said storing chamber, conduit means extending downwardly from said storing chamber opening to said liquid distributing portion; said liquid distributing portion including a substantially horizontal distribution chamber, said distribution chamber having a length substantially greater than the cross section thereof, said distribution chamber including an inlet opening adjacent the top thereof, said inlet opening being connectable with said conduit means, a plurality of spaced outlet openings in said distribution chamber, said outlet openings being arranged along at least one substantially horizontal line disposed longitudinally of said distribution chamber and located intermediate the top and bottom of said chamber, said conduit means extending through said inlet opening of said distribution chamber to a point adjacent said horizontal line of openings in said chamber, textile material associated with said distribution chamber, said textile material being disposed with one section wrapped around the periphery of said distribution chamber and the opposite end section extending from said wrapped section a distance greater than the diameter of said distribution chamber; said mounting portion including at least one bracket means having one end affixible to said distribution chamber, said bracket means including a connector section extending from said distribution chamber, fastening means disposed adjacent the free end of said connector section, said fastening means being connectable to a lawnmower housing, support means extending upwardly from said connector section capable of supporting said liquid storing portion above said distribution chamber.

2. Liquid applying apparatus according to claim 1 wherein a second horizontal line of openings is disposed on the opposite side of said distribution chamber from said first line of openings and said second line is located at the same level as said first line.

3. Liquid applying apparatus according to claim 1 wherein said spaced openings extend substantially the entire length of said distribution chamber.

4. Liquid applying apparatus according to claim 1 wherein said textile material extends substantially the entire length of said distribution chamber.

5. Liquid applying apparatus according to claim 1 wherein said textile material is a napped fabric.

6. Liquid applying apparatus according to claim 1 wherein said conduit means includes a separable section extending through said inlet opening of said distribution chamber.

7. Liquid applying apparatus according to claim 1 wherein said conduit means includes a flexible section extending between said storing chamber and said distribution chamber.

8. Liquid applying apparatus according to claim 1 wherein said mounting portion includes pivotable connecting means.

9. Liquid applying apparatus according to claim 1 including bracket means connectable adjacent both ends of said distribution chamber.

10. Liquid applying apparatus according to claim 1 wherein said storing chamber includes a separable closure means having an opening connectable to said conduit means.

* * * * *